United States Patent [19]

Wagensonner

[11] 3,987,462

[45] Oct. 19, 1976

[54] EQUIPMENT FOR MINIMIZING THE POWER LOSS IN A STEP MOTOR IN A CAMERA

[75] Inventor: Eduard Wagensonner, Aschheim, Germany

[73] Assignee: AGFA-Gevaert, A.G., Leverkusen, Germany

[22] Filed: Oct. 24, 1974

[21] Appl. No.: 517,805

[30] Foreign Application Priority Data

Oct. 26, 1974  Germany............................ 2353703

[52] U.S. Cl.................................... 354/44; 354/271
[51] Int. Cl.²......................... G03B 7/08; G03B 9/02
[58] Field of Search.......................... 354/44, 271

[56] References Cited
UNITED STATES PATENTS

| | | | |
|---|---|---|---|
| 3,226,574 | 12/1965 | Winkler | 307/296 X |
| 3,430,117 | 2/1969 | Sennhenn | 318/681 X |
| 3,587,112 | 6/1971 | Hill | 346/50 |
| 3,813,680 | 5/1974 | Wagensonner et al. | 354/44 |

*Primary Examiner*—Joseph F. Peters, Jr.
*Attorney, Agent, or Firm*—Michael J. Striker

[57] ABSTRACT

A camera has a step motor for stepwise adjustment of the value of an exposure factor. When the value of the exposure factor differs from the desired value a pulse generator furnishes a series of pulses to a ring counter which in turn connects each of the energizing windings of the step motor to a reference potential. The step motor rotates until the desired exposure factor value has been achieved and the pulse sequence ceases. A transistor is connected between the battery and the second terminals of all the windings and is maintained in a conductive state only in the presence of the pulses from the pulse generator. When the exposure factor is at the desired value and no further rotation of the step motor is required all windings are deenergized therefore decreasing the power loss in the motor.

7 Claims, 1 Drawing Figure

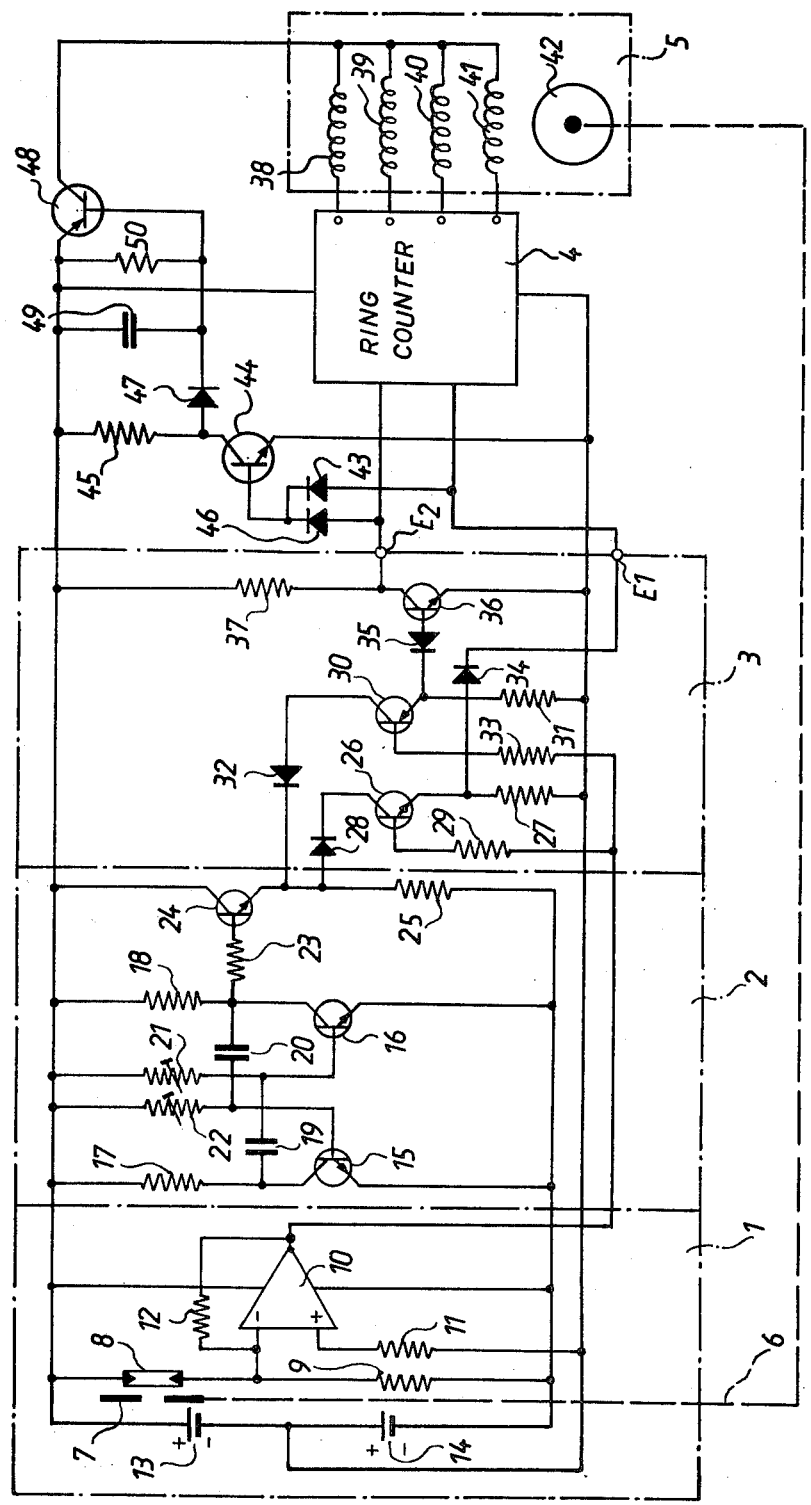

EQUIPMENT FOR MINIMIZING THE POWER LOSS IN A STEP MOTOR IN A CAMERA

BACKGROUND OF THE INVENTION

This invention relates to photographic or motion picture cameras which have a step motor utilized for stepwise adjustment of the value of an exposure factor. The step motor has a predetermined number of energizing windings. A motor control circuit energizes the windings individually or in combination in a predetermined sequence under control of pulses from a pulse generator. The pulse generator furnishes the pulses only until the exposure factor is set to the desired value.

SUMMARY OF THE INVENTION

It is the object of the present invention to furnish a photographic or a motion picture camera of the above-described type in which the power consumed by the step motor is kept to a minimum. In particular, the current consumption of those elements carrying the maximum current is to be decreased. The object is to be accomplished with simple circuitry.

The present invention resides in a camera having exposure control means adapted for stepwise adjustment of an exposure factor. It comprises a step motor connected to said exposure control means for making said stepwise adjustment in response to pulses applied to said energizing windings. It further comprises pulse generator means for furnishing said pulses until said exposure factor is equal to a desired exposure factor. It further comprises switch means connected to all of said windings, for energizing said windings when in a first state and deenergizing said windings when in a second state. Finally, switch control means are furnished which are connected to the pulse generator means and the switch means, for maintaining said switch means in said first state only in response to pulses from said pulse generator means. It will be noted that in the above arrangement the energizing circuit for the energizing windings is always interrupted in the absence of an error signal, that is when the exposure factor is equal to the desired exposure factor. The step motor has a permanent magnet armature. The step motor is so designed that it will be maintained in an equilibrium position determined by the last of the energizing coils energized even in the absence of quiescent current through said coil because of the inherent magnetic moments of the magnetic circuit of the step motor. Energization of each energizing coil thus causes the motor to progress from one equilibrium position to the other.

In a preferred embodiment of the present invention integrator means are provided between the switch means and the pulse generator means in order that the switch means be maintained in the conductive state all through the pulse sequence. In a particular preferred embodiment of the present invention the integrator means include a capacitor connected between the base and emitter of the switching transistor which constitutes the switch means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE shows the circuit of the present invention.

DESCRIPTION OF THE PREFERRED EMBODIMENTS

A preferred embodiment of the present invention will now be described with reference to the drawing.

In FIG. 1, reference numeral 1 denotes a light measuring circuit, reference numeral 2 a pulse generator, reference numeral 3 a gating circuit (units 2 and 3 together herein are referred to as pulse generator means) and reference numeral 4 a ring counter. Unit 4 is herein referred to as motor control means. A step motor is identified by reference numeral 5. A mechanical coupling 6 which may be either a direct coupling or through suitable gearing, couples the motor to a diaphragm 7, one embodiment of exposure control means. Diaphragm 7 may be either the main diaphragm of the camera or an auxiliary diaphragm. In the latter event, a further connection must of course be furnished between step motor 5 to the main diaphragm.

The light measuring arrangement 1 includes a photoresistor 8 which is connected in series with a resistor 9. The common point of photoresistor 8 and resistor 9 is connected to the inverting input of an operational amplifier 10. The non-inverting input of operational amplifier 10 is connected to a resistor 11. A resistor 12 is a feedback resistor connected from the output of the inverting input of operational amplifier 10. Photoresistor 8 is mounted behind diaphragm 7. Power is supplied to operational amplifier 10 by batteries 13 and 14 connected in series.

Further, batteries 13 and 14 serve as the source of electrical energy for an astable multivibrator. This comprises transistors 15 and 16, a resistance 17 is connected in the collector circuit of transistor 15 while a resistor 18 is connected in the collector circuit of transistor 16. The collector of transistor 15 is connected to a capacitor 19 whose other terminal is connected to the base of transistor 16. The collector of transistor 16 is connected to a capacitor 20 whose other terminal is connected to the base of transistor 15. Capacitor 19 together with resistor 21 and capacitor 20 together with resistor 22 each constitute a timing circuit. The astable multivibrator oscillates at a frequency which is determined by the values of timing circuits 19, 21 and 20, 22. The collector of transistor 16 is connected through a resistor 23 to the base of an output transistor 24. A resistor 25 is connected in the emitter circuit of transistor 24.

Gating circuit 3 consists of two emitter followers. The first emitter follower consists of a transistor 26 and its emitter resistor 27. The terminal of resistor 27 which is not connected to transistor 26 is connected to the common point of batteries 13 and 14. A diode 28 is connected between the emitter of transistor 24 and the collector of transistor 26. The base of transistor 26 is connected through a resistor 29 to the output of operational amplifier 10.

The second emitter follower includes a transistor 30 which is of an opposite conductivity type relative to transistor 26. The emitter resistor 31 of transistor 30 is also connected to the common point of batteries 13 and 14. A diode 32 is connected between the emitter of transistor 24 and the collector of transistor 30. The base of transistor 30 is connected through a resistor 33 to the output of operational amplifier 10.

A diode 34 connects the emitter of transistor 36 to the first input E1 of motor control circuit 4. The emitter of transistor 30 is connected through a diode 35 to the base of a transistor 36 in whose collector circuit is connected a resistor 37. The collector of transistor 36 is directly connected to the second input, E2, of motor control circuit 4. The voltage generated by astable multivibrator 2 varies between the positive potential of battery 13 and the negative potential of battery 14. However the reference potential for gating circuit 3 is a zero potential. Thus only positive pulses with respect to zero potential are applied to the E1 input of motor control circuit 4 when transistor 26 is conductive. When transistor 30 is conductive, negative pulses appear at its emitter which are inverted by transistor 26 into positive pulses which are then applied to the input E2 of motor control circuit 4. Since, in accordance with the sign of the output of operational amplifier 10, only one of transistors 26 and 30 is conductive at any one time, pulses are applied only to input E1 or to input E2, but never to both inputs simultaneously.

In a preferred embodiment of the present invention unit 4 comprises a commercially available ring counter. These counters comprise a plurality of bistable stages each being switched from a first to a second state in response to a pulse at an input terminal in the presence of a previous stage which is in the second state. The last stage of the ring counters is connected to the first stage. A circuit diagram of such a ring counter may be found in U.S. Pat. No. 3,813,780, FIG. 1, unit 4. Battery 13 of this United States patent corresponds to battery 13 of the present application. Coils 38–40 are the energizing windings for the present invention, the terminals of windings 38–40 which are not connected to battery 13 are individually connected to the output terminals of unit 4.

As shown in the FIGURE, the ring counter used in the present invention has both a forward counting and a reverse counting input, E1 and E2 respectively. The ring counter has a plurality of output terminals each connected to one terminal of an energizing winding of motor 5. As each stage of the ring counter is switched from a first to a second state, the corresponding output terminal is connected to what is herein referred to as a predetermined first potential, here ground potential. Setting of each stage of the ring counter of course causes resetting of the previous stage so that only one input terminal is connected to ground potential at a time. While this constitutes the preferred embodiment of the present invention, commercially available ring counters can also be such that more than one output terminal is connected simultaneously to ground potential. This embodiment is not to be excluded from the present invention. In any event the output terminals are connected to the predetermined first potential in a determined order in response to pulses at inputs E1 and in the reverse order in response to pulses at input E2.

In the embodiment shown in the FIGURE, four energizing windings 38, 39, 40 and 41 are shown. Step motor 5 further has a permanent magnet armature 42.

A diode 43 is connected from input E1 to the base of a transistor 44. The collector of transistor 44 is connected through a resistor 45 to the positive side of battery 13. A diode 46 is connected from input E2 of motor control circuit 4 to the base of transistor 44. A diode 47 connects the collector of transistor 44 to the base of transistor 48. The latter is referred to herein as a semiconductor switch means while diodes 43, 46 and transistor 44 as well as resistor 45 are referred to as switch control means the semiconductor switch and the switch control means together constituting switch means. Capacitor 49, one embodiment of integrator means is connected from the emitter to the base of transistor 48. A very high inpedance resistor 50 is connected in parallel with capacitor 49. The emitter-collector circuit of transistor 48 is connected on the one side to the second terminal of all windings 38–41 and on the other side to the positive side of battery 13.

The above-described arrangement operates as follows: First let it be assumed that the actual aperture size as determined by the light received by photoresistor 8 is different from the desired aperture size as determined by the voltage applied to the direct input of operational amplifier 10. Thus a potential difference exists between the two inputs of operational amplifier 10 and, depending upon the polarity of this difference, a positive or a negative voltage appears at the output of operational amplifier 10. The polarity of this output voltage is of course a measure of whether the actual aperture size is larger or smaller than the desired aperture size. Astable multivibrator 2 furnishes pulses having a frequency depending upon the timing circuits 19, 21 and 20, 22. Thus, with reference to the common point of batteries 13 and 14 (zero potential) both positive and negative pulses appear at the emitter of transistor 24. If the voltage at the output of operational amplifier 10 is a positive voltage, transistor 26 is conductive causing the positive pulses appearing at the emitter of transistor 24 to be applied through diodes 34 and 28 to input E1 of motor control circuit 4. These positive pulses cause the ring counter to energize windings 38–41 in turn causing the permanent magnet armature 42 to be turned in a stepwise fashion. Of course while transistor 26 is conductive, transistor 30 is blocked.

If however the voltage at the output of operational amplifier 10 is a negative voltage, transistor 26 is blocked while transistor 30 becomes conductive. Thus negative pulses appearing at the output of the astable multivibrator are applied through diode 32, the emitter-collector circuit of transistor 30 and diode 35 to the base of a transistor 36. The pulses appearing at the collector of transistor 36 are thus positive pulses. These of course are directly applied to the input E2 of motor control means 4. Energization of windings 38–41 now takes place in the reverse order. Armature 42 rotates in the opposite direction to the previous rotation.

In accordance with the present invention the pulses both at input E2 and at input E1 are applied through an OR-circuit including diodes 43 and 46 to the base of transistor 44. These pulses cause transistor 44 to become conductive. Thus a voltage drop occurs across resistor 45. The pulse peaks are applied through diode 47 to the base of transistor 48 and also to capacitor 49 which stores them. Thus a negative potential relative to its emitter appears at the base of transistor 48. Transistor 48 thus becomes conductive This is referred to as its first stable state. The emitter-collector circuit of transistor 48, when in said first stable state, causes the second terminals of windings 38–41 to be connected to the means for furnishing a second predetermined potential, namely the line connecting the emitter of transistor 48 to the positive side of battery 13. With the emitter-collector circuit of transistor 48 conductive, the ring counter can serve to complete the circuit of windings 38–41 in turn. When transistor 48 is non-conductive, of course the energizing circuits of all windings are broken. It will be noted that transistor 48 is conductive in response to pulses at either input E1 or input E2, that is as long as an error signal exists at the output of operational amplifier 10. In the absence of such error signal transistor 48 is blocked as soon as capacitor 49 has discharged sufficiently through high resistor 50. The resistance of resistor 50 must of course be so chosen that the capacitor does not discharge any substantial amount between consecutive pulses at either inputs E1 or E2.

It is to be noted that the above-described circuitry causes the quiesscent current to the motor to be interrupted, that is step motor 5 is energized only when it is necessary to turn its armature and not when the circuit is at rest. Substantial power savings thus occur and the drain on batteries 13 and 14 is considerably decreased.

While the invention has been illustrated and described as embodied in specific motor control switch and switch control circuits, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended:

1. In a camera having exposure control means adapted for stepwise adjustment of an exposure factor, comparing means for comparing the actual exposure factor to a desired exposure factor and furnishing an error signal in response to a difference therebetween, stepmotor means having a plurality of energizing windings and coupled to said exposure control means for making said stepwise adjustment upon energization of said energizing windings, and motor control means interconnected between said comparing means and said stepmotor means for energizing said windings of said stepmotor in a determined sequence under control of said error signal, said motor control means being adapted to maintain the energization of the last of the so-energized windings in the absence of said error signal, thereby creating a power loss, the improvement comprising switch means interconnected between said comparing means and said energizing windings, for deenergizing all of said energizing windings whenever said error signal is absent, thereby eliminating said power loss.

2. A camera as set forth in claim 1, further comprising pulse generator means connected to said comparing means for furnishing a sequence of pulses in response to said error signal; and wherein said motor control means has at least one input terminal connected to said pulse generator means and a plurality of output terminals each connected to a corresponding one of said energizing windings.

3. A camera as set forth in claim 2, wherein said comparing means furnish a positive or negative error signal in dependence upon the sign of the difference between said actual and desired factor; wherein said motor control means has a first and second input; further comprising means for connecting said pulse generator means to said first or said second input in dependence upon said sign of said error signal.

4. A camera as set forth in claim 3, wherein said switch means comprise a semiconductor switch, an OR-circuit having a first and second input respectively connected to said first and second input of said motor control means and an output connected to said semiconductor switch in such a manner that said semiconductor switch is in conductive state in response to said sequence of pulses appearing at said first or second input of said OR-circuit.

5. A camera as set forth in claim 4, wherein said semiconductor switch has a control electrode; further comprising integrator circuit means connected between said pulse generator means and said control electrode for maintaining said semiconductor switch in the conductive state throughout the sequence of pulses at said first or said second inputs.

6. A camera as set forth in claim 5, wherein each of said energizing windings has a first and second terminal; wherein said motor control means has a plurality of output terminals each connected to said first terminal of a corresponding one of said energizing windings, for connecting each of said first terminals to a predetermined first potential in a predetermined sequence in response to said sequence of pulses; means for furnishing said first predetermined potential to said motor control means; wherein said semiconductor switch has a main conducting circuit; further comprising means for furnishing a second predetermined potential, and means for connecting said main conducting circuit of said semiconductor switch between said second terminals of said windings and said means for furnishing said second predetermined potential.

7. A camera as set forth in claim 1, wherein said stepmotor has a permanent magnet armature.

* * * * *